Nov. 3, 1953  J. M. PESTARINI  2,658,177
SPEED RESPONSIVE ELECTRICAL DEVICE
Filed Nov. 27, 1946

INVENTOR
Joseph M. Pestarini
BY
Philip G. Hilbert
ATTORNEY

Patented Nov. 3, 1953

2,658,177

UNITED STATES PATENT OFFICE 2,658,177

SPEED RESPONSIVE ELECTRICAL DEVICE

Joseph Maximus Pestarini, Staten Island, N. Y.

Application November 27, 1946, Serial No. 712,629

2 Claims. (Cl. 322—90)

The invention relates to electrical machines rotating at variable speed. More particularly, the invention concerns means for creating a current at a predetermined speed of the electrical machine.

An object of the invention is to provide a rotatable variable speed direct current machine adapted to create a peak of current at a predetermined speed including means for varying the value of said predetermined speed.

Another object of the invention is to provide a variable speed, direct current machine adapted to absorb a current which reaches a peak at a predetermined speed and including means for varying the value of said predetermined speed.

A further object of the invention is to provide a variable speed, direct current machine adapted to create a peak of current at a predetermined speed and to absorb a peak of current at another predetermined speed and including means for varying the value of said predetermined speeds.

The direct current rotatable machines, mentioned in the invention, may take the form of dynamos and metadynes.

Figure 1:
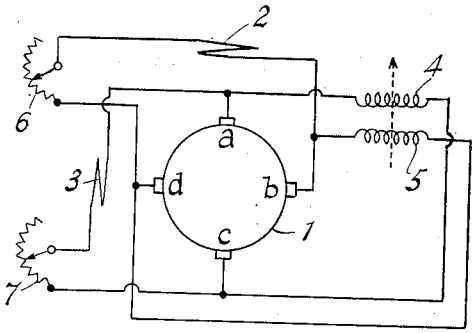
Figure 3:
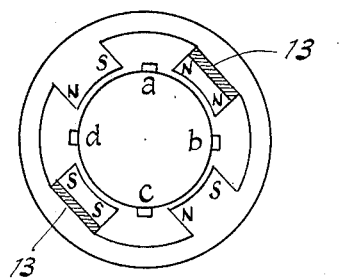
Figure 2:
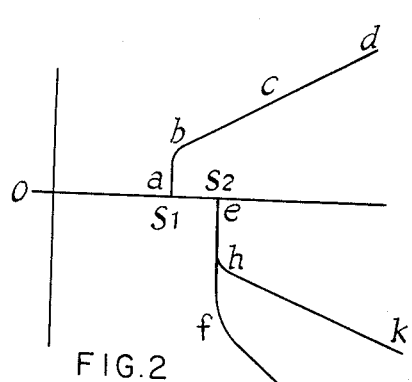
Figure 6:
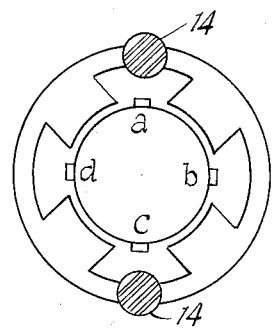
Figure 5:
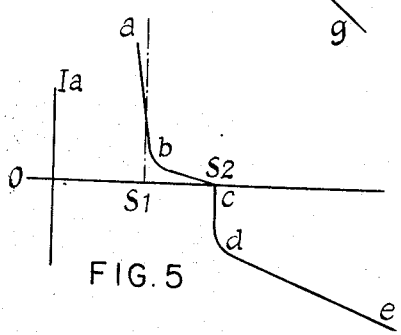
Figure 7:
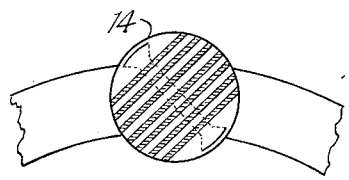
Figure 8:
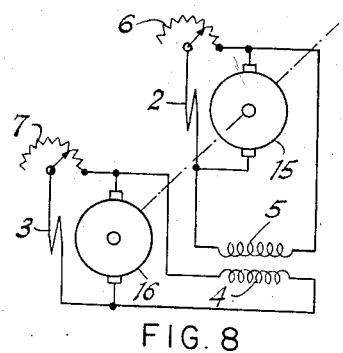
Figure 4:
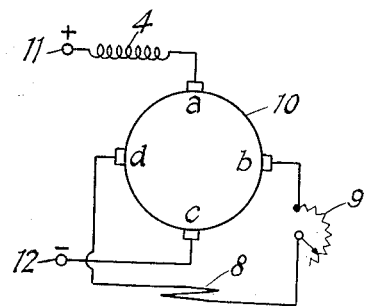

Figure 1 shows the connections of a variable speed, direct current machine; Figure 2 is a diagram illustrating the operation of the arrangement shown in Figure 1; Figure 3 shows details of a device embodying the invention; Figure 4 shows a further arrangement of the interconnections of an electrical machine embodying the invention; Figure 5 is a diagram illustrating the operation of the arrangement shown in Figure 4; Figure 6 shows details of the magnetic circuit of a machine embodying the invention; Figure 7 shows an enlargement of a portion of the machine shown in Figure 6; Figure 8 shows the interconnections of two dynamos, embodying the invention.

The metadyne, herein mentioned, is an electric direct current machine having more than two brushes per cycle, the flux created by the current traversing the armature through a pair of brushes inducing an electromotive force between the brushes of another pair of the same cycle. The number of cycles of an electric machine is defined as the number of times that an observer, accomplishing a complete revolution along the air gap, sees all electrical and magnetic parts repeated in the same disposition.

The metadyne has been described in United States Patents Nos. 2,055,240; 1,987,417; 2,038,380; 2,049,389; and 2,079,465. A more complete description has been given in Revue Generale de l'Electricite, on March 8th and 15th, August 16th and 23rd, November 22nd and 29th, and December 6, 1930, Paris.

In Figure 1 is shown a rotatable direct current machine such as a metadyne for supplying current and adapted to rotate at varible speed. Said metadyne, includes an armature 1 provided with a pair of non-consecutive, primary brushes $a$, $c$ and a pair of secondary brushes $b$, $d$ and stator windings 2, 3 for controlling the operation of said metadyne. The winding 2 is so disposed as to have its magnetic axis coincident with the flux created by the current traversing the armature through its primary brushes $a$, $c$. The winding 2 is shunt connected across secondary brushes $b$, $d$ with a rheostat 6 connected in series therewith. The winding 3 is so disposed as to have its magnetic axis coincident with the flux created by the current traversing the armature through the secondary brushes $b$, $d$. The winding 3 is shunt connected across primary brushes, $a$, $c$ with a rheostat 7 connected in series therewith. A pair of windings 4, 5 which may constitute elements of circuits external to the metadyne, are connected in the primary and secondary brush circuits, respectively, and are thus energized by the primary and secondary currents of the metadyne, respectively.

The windings 4 and 5 have a common magnetic axis indicated by the arrow in the figure and are adapted, when energized, to create a flux in the indicated direction. The flux, so created, may control the operation of current utilizing electric devices, as for example, of a relay or of a rotating electric machine having coils 4, 5 as components thereof.

When the speed of the metadyne is of a low value, no current is created. The electromotive force induced between the secondary brushes $b$, $d$ divided by the current which induces said electromotive force when it traverses the winding 2, and when the magnetic circuit is unsaturated, is equal to the resistance of said winding 2, at a predetermined speed $S_1$. At such speed, which may be referred to as a critical speed with respect to winding 2 and brushes $b$, $d$, a peak of current traverses the secondary brushes $b$, $d$ of the metadyne. Said peak of current traverses the winding 5 and creates ampere turns in the winding 5 having the direction indicated by the arrow.

Similarly, a speed $S_2$, which may be referred to as a critical speed with respect to winding 3 and brushes $a$, $c$, may be defined as the speed at which the electromotive force induced between the primary brushes $a$, $c$ divided by the current creating such electromotive force when traversing the winding 3 under the conditions previously indicated, equals the resistance of the winding 3. At said speed $S_2$, a peak of current is created between the primary brush $a$, $c$ and traverses winding 4, thus creating a flux.

Assume $S_2$ is greater than $S_1$. Then if the motor metadyne is operating at speed $S_1$, the last mentioned flux has a direction opposite to that created by winding 5, and there will be obtained a resultant flux in the direction of the arrow shown in the figure. Such resultant flux will suddenly change its direction upon reaching the speed $S_2$ if the flux created by winding 4 is also greater than the flux created by winding 5.

The diagram of Figure 2 illustrates the operation of the device shown in Figure 1, wherein the abscissa represents the speed and the ordinates represent the flux. When speed $S_1$ is reached, the winding 5 creates a flux represented by the curve $abcd$. When the speed $S_2$ is reached, the winding 4 will create a flux represented by the curve $efg$. The resultant flux will be represented by the curve $ehk$.

If on the contrary, it is assumed that the currents traversing the two windings 4 and 5 create ampere turns having the same direction, one will obtain a peak of flux for the speed $S_1$ and a greater peak for the speed $S_2$, without change of direction.

The rheostats 6 and 7 inserted in the circuit of the winding 2 and in the circuit of the winding 3, respectively, allow for an adjustment of the value of the speeds $S_1$ and $S_2$, respectively.

Similar results may be obtained when the windings 2 and 3 are connected in series with the secondary brushes and the primary brushes, respectively.

It is important to insure a particular direction for both the currents traversing coils 4, 5 when they attain their peaks. In order to obtain such result, a small amount of permanent ampere turns creating a small voltage along the desired direction may be provided on the metadyne. Such ampere turns may be provided by auxiliary windings. In lieu of said auxiliary windings, one may provide the magnetic circuit of the machine with an element of a permanent magnet having a strong magnetic resilience. Such an arrangement is shown in Figure 3, wherein the magnetic circuit of the metadyne has four polar segments equiangularly disposed. A pair of oppositely disposed polar segments indicated at NN, SS, respectively, are provided with permanent magnets 13 at their bases. These polar segments are of opposite polarity, based upon the proper disposition of the permanent magnets 13.

In Figure 4 is shown the interconnections of a variable speed direct current machine such as a metadyne 10, embodying the invention. The same comprises a pair of non-consecutive, primary brushes $a$, $c$ which are connected to terminals 11, 12 of a direct current constant voltage source. The metadyne 10 further comprises a pair of secondary brushes $b$, $d$ which are connected to a stator winding 8 having its magnetic axis coincident with the commutating axis of the primary brushes $a$, $c$. The current traversing said stator winding 8 induces an electromotive force between the secondary brushes $b$, $d$ tending to increase the value of said current. At low speed, the metadyne 10 will operate as a motor. Then the primary current, supplied by the direct constant voltage source through terminals 11, 12 and traversing the primary brushes $a$, $c$, in one positive direction, creates a flux, referred to as primary flux, which induces an electromotive force between the secondary brushes $b$, $d$. Thus the secondary brushes will supply a current which creates a flux, referred to as secondary flux, coincident with the commutating axis of the secondary brushes, which in its turn will induce a counter-electromotive force between the primary brushes substantially balancing the constant voltage of the direct current source. When the speed of metadyne 10 increases and reaches the value, $S_2$, which is the critical speed with respect to winding 8 and brushes $b$, $d$, a peak of current due to the action of the stator winding 8 upon the brushes $b$, $d$, occurs and a large voltage will be suddenly induced between the secondary brushes giving rise to a relatively large secondary current. The secondary current will create a relatively large counter-electromotive force between the primary brushes and this will not only reverse the direction of the primary current and cause the metadyne to operate as a generator, but it will also create a peak of primary current in the opposite direction. If the speed further increases, the primary current will increase steadily.

Assume that the speed decreases below the value $S_2$, a slight primary current is supplied by the direct current source. When the speed decreases the secondary flux, inducing the counter-electromotive force between the primary brushes balancing the constant voltage of the direct current source, must increase inversely proportional to the speed and at a sufficiently low speed, say $S_1$, a strong saturation of the iron will be required. Therefore, the primary brushes of the metadyne will absorb a current quickly increasing for a slight decrease of the speed, causing thus the primary current to show a peak in the first mentioned direction.

Thus the metadyne 10 of Figure 4 shows a peak of the primary current in one direction at the speed $S_1$. This current decreases to a very slight value as the speed increases and when the speed reaches the speed $S_2$, the primary current will show a second peak of current in the opposite direction, as previously explained. For values of the speed higher than the value $S_2$, the primary current will steadily increase in the opposite direction. For values of speed lower than the speed $S_1$, the said primary current will continue to rapidly increase in the first mentioned direction. Figure 6 shows the diagram, illustrating curves for the primary current of the metadyne of Figure 4 operating in the above described manner. It is obvious that the speed $S_2$ relative to the peak of the current in the secondary circuit, must be higher than the speed $S_1$ relative to the advent of the iron saturation.

The current $Ia$ is indicated as an ordinate with the speed indicated as abscissa. Thus, the curve $abcde$ shows the values of said current at different speeds. A peak of current is indicated at speed $S_1$ in one direction and another peak of current is indicated at speed $S_2$ in the opposite direction.

With two peaks of current created by the primary brushes of metadyne 10, the circuit shown in Figure 4 may be utilized to energize a single coil of an external circuit such as coil 4 previously described and yet obtain within such coil two peaks of flux in opposite direction.

For setting the value of the speed $S_2$, one may use the rheostat 9 inserted in the secondary brush circuit. For setting the value of the speed $S_1$ one may modify the value of the constant voltage supplied by the direct current source by well known means, not shown. One may influence both of these values by modifying the permeance of the magnetic circuit of the metadyne 10. This is particularly suitable for modifying the speed $S_1$. According to the invention, one may use the device shown in Figure 6 for this purpose. Two movable cylindrical magnetic members 14, 14 are inserted in transverse openings formed in the magnetic yoke of the stator of the metadyne along the direction of the primary commutating axis. The members 14, shown in Figure 7, are composed of sheets of magnetic material indicated by the hatched layers alternately laminated with sheets of non-magnetic material and secured together by a rivet shown in dotted outline. The members 14 may be adjustably rotated by hand and the permeance of the magnetic circuit of the yoke is controlled by the relative angular position of the members 14. It is important to note that the magnetic control members 14 are located along the commutating axis of the primary brushes and do not interfere with the secondary flux coincident with the commutating axis of the brushes $b$, $d$.

Figure 8 shows an embodiment of the invention comprising two dynamos 15 and 16. The dynamo 15 is shunt excited by a field winding 2 and the dynamo 16 is shunt excited by a field winding 3. The critical speed of each dynamo may be separately controlled by means of the rheostats 6 and 7 interposed in the respective field winding circuits.

The dynamos 15, 16 are coupled to a common variable speed shaft, rotated by means not shown. Windings 4, 5 are similar to the corresponding windings previously referred to in connection with Figures 1, 2. The winding 4 is energized by the dynamo 16 while winding 5 is energized by dynamo 15. The rheostats 6, 7 are set to allow dynamos 15, 16 to create peak of currents in coils 5, 4 respectively at two predetermined values of speed of the variable speed shaft.

Thus a peak of current will traverse winding 5 at a predetermined speed $S_1$, said speed being the critical speed of the dynamo 15. Another peak of current will traverse the winding 4 at a predetermined speed $S_2$ corresponding to the advent of the iron saturation of the metadyne 17.

It is understood that arrangements for obtaining more than two peaks of current at different values of speed, may be provided by using suitable combinations of metadynes and dynamos or combinations of dynamos alone, each combination being operated by a common shaft rotating at a variable speed.

What I claim is:

1. A system comprising a variable speed direct current machine and a pair of external circuits energized by said machine, said machine comprising an armature provided with a pair of sets of brushes and a pair of stator windings respectively shunt connected to said sets of brushes, each of said external circuits comprising a winding, said last mentioned windings being respectively connected in shunt relation to said sets of brushes, said last mentioned windings being arranged to have a common magnetic axis, said machine being operative to produce a peak of current in one of said last mentioned windings at a rotational speed at which the electromotive force between the set of brushes associated with said one winding divided by the current traversing the stator winding associated with said last mentioned set of brushes equals the resistance of said last mentioned stator winding and being further operative to produce a peak of current in the other of said last mentioned windings at a rotational speed at which the electromotive force between the set of brushes associated with the other winding divided by the current traversing the stator winding associated with said last mentioned set of brushes equals the resistance of said last mentioned stator winding.

2. A system as in claim 1 and further including variable resistance means in circuit with each of said stator windings.

JOSEPH MAXIMUS PESTARINI.

References Cited in the file of this patent

UNITED STATES PATENTS

| Number | Name | Date |
|---|---|---|
| 1,044,827 | Smith | Nov. 19, 1912 |
| 1,157,414 | Neuland | Oct. 19, 1915 |
| 2,424,121 | Schlatfer | July 15, 1947 |
| 2,451,921 | Cook | Oct. 19, 1948 |